Figure 1:
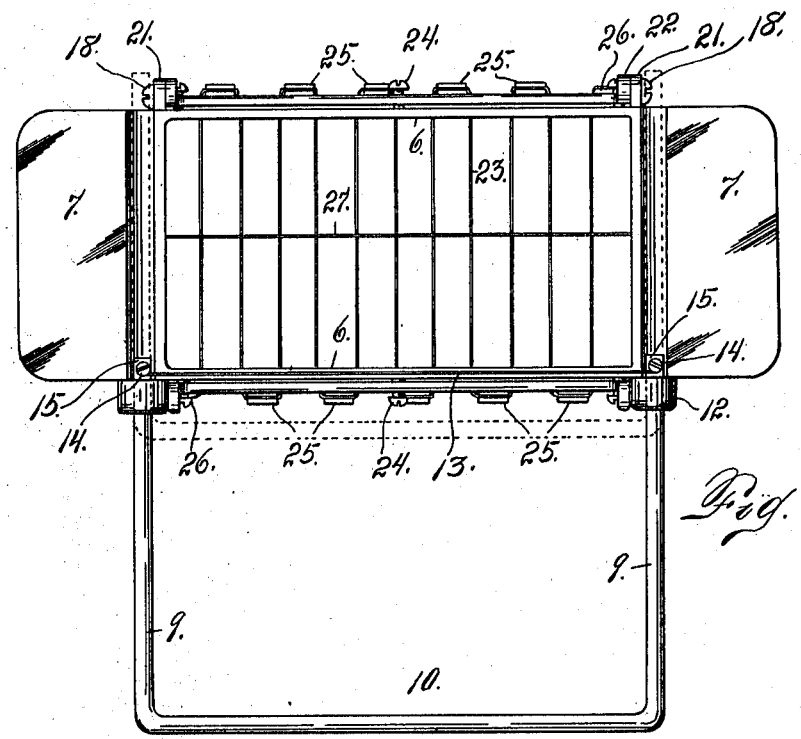

H. B. WATERS.
BUTTER CUTTER.
APPLICATION FILED AUG. 16, 1911.

1,027,020.

Patented May 21, 1912.

2 SHEETS—SHEET 1.

Witnesses
C. H. Rosener
Otto E. Hoddick

Inventor
H. B. Waters
By A. J. O'Brien
Attorney

H. B. WATERS.
BUTTER CUTTER.
APPLICATION FILED AUG. 16, 1911.
1,027,020.
Patented May 21, 1912.
2 SHEETS—SHEET 2.
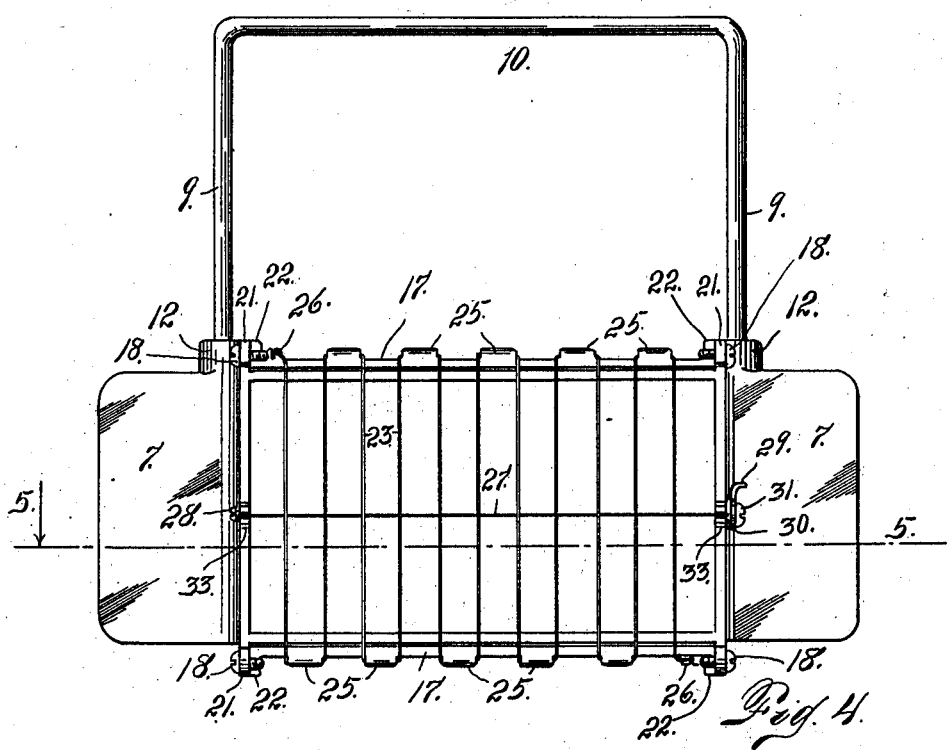
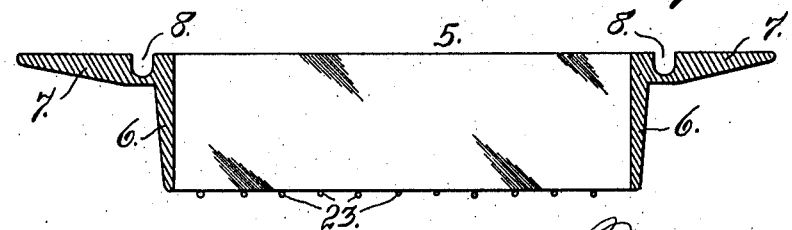
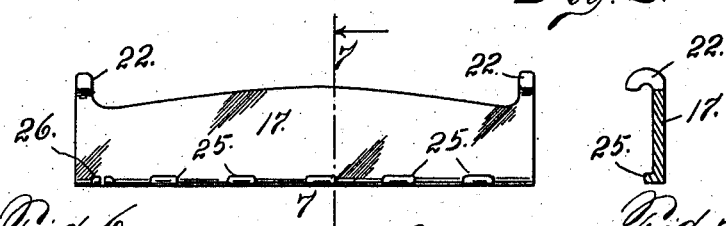
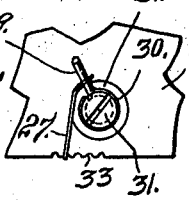
Witnesses
C. H. Rosner
Otto E. Hoddick
Inventor
H. B. Waters
By A. J. O'Brien
Attorney
COLUMBIA PLANOGRAPH CO., WASHINGTON, D. C.

UNITED STATES PATENT OFFICE.

HARRY B. WATERS, OF DENVER, COLORADO.

BUTTER-CUTTER.

1,027,020.  Specification of Letters Patent.  Patented May 21, 1912.

Application filed August 16, 1911. Serial No. 644,462.

*To all whom it may concern:*

Be it known that I, HARRY B. WATERS, a citizen of the United States, residing in the city and county of Denver and State of Colorado, have invented certain new and useful Improvements in Butter-Cutters; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in butter cutters, my object being to provide a simple and efficient device for properly performing the butter cutting function.

An important feature of my improved device consists in the fact that the cutter is portable,—that is to say, it does not require attachment to a stationary object in order to perform its function.

Generally speaking, the device consists of a rectangular frame having projecting flanges at its opposite ends, the frame being provided on what may be termed its cutting open face with wires arranged a suitable distance apart to gage the thickness of the cakes of butter, a single wire being centrally arranged longitudinally of the device for dividing a pound cake of butter longitudinally, thus making the cakes, when they are cut, practically square or half the width of the ordinary pound cake or brick of butter. The transverse wires are held in place on opposite sides of the rectangular frame by two gage plates, which are laterally adjustable by means of screws for regulating the tension of the transverse wires. These gage plates are readily detachable, for purposes of renewal when it becomes practicable to thoroughly clean the device, whenever it may be necessary. The vertical depth of the frame, or its depth when in position for use, is half the thickness of a pound cake of butter. This is the preferred and convenient size, though it is evident that it may be made of a size to cut larger butter bricks, if it should be desirable or necessary. A U-shaped frame, having a cutting wire connected with the free extremities of its parallel arms, is slidably mounted on the frame, whereby it may be reciprocated for the purpose of dividing the butter brick centrally. In other words, when the cake or brick of butter is in place,—that is to say, after the wires attached to its lower or cutting face have been pressed through the cake of butter, whereby the latter is caused to enter the rectangular frame, half of the cake of butter will protrude above the said frame. The U-shaped member is then moved to cause the wire connecting its ends to cut the cake of butter just above the top of the rectangular frame, thus dividing the cake equally in a plane parallel to the two faces of the cake. In this way, the brick of butter is divided into as many pieces as may be required, only two motions being necessary,—one to press the frame down over the butter brick whereby the latter is caused to enter the frame and protrude above the same; and the other, the movement of the U-shaped member for the purpose of sub-dividing the pieces of butter into which the cake has been cut by the wires stretched across the lower face of the frame.

Having briefly outlined my improved construction, I will proceed to describe the same in detail, reference being made to the accompanying drawing, in which is illustrated an embodiment thereof.

Figure 2:
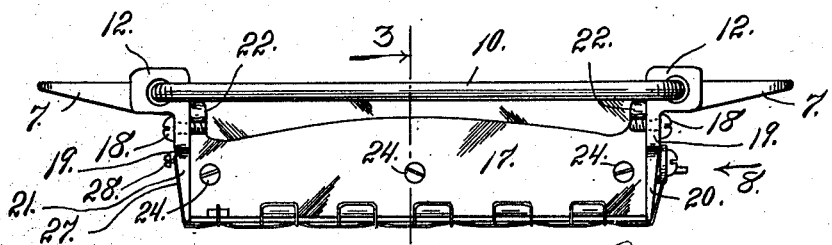
Figure 3:
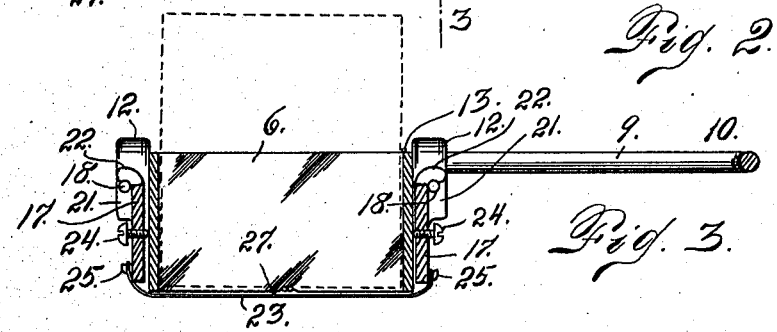

In this drawing: Figure 1 is a top plan view of the device in position for use. Fig. 2 is a side elevation of the same. Fig. 3 is a transverse section, taken on the line 3—3 of Fig. 2, viewed in the direction of the arrow. Fig. 4 is an underneath plan view. Fig. 5 is a section, taken on the line 5—5 of Fig. 4. Fig. 6 is a detail view of one of the tension gage plates. Fig. 7 is a section, taken on the line 7—7 of Fig. 6. Fig. 8 is a fragmentary detail view, illustrating the means for regulating the tension of the longitudinal wire coöperating with the transverse wires of the device. This is a view looking in the direction of arrow 8, Fig. 2.

The same reference characters indicate the same parts in all the views.

Let the numeral 5 designate a rectangular frame, which, as illustrated in the drawing, is composed of an integral casting of a depth equal to half the thickness of the cake of butter to be cut. The opposite end members 6 of this frame are provided at their upper edges with flanges 7, whose upper surfaces are flush with the upper edges of the said frame. These flanges form handholds for the user when pressing the device over a cake of butter during the butter cutting operation. The flanges are provided with grooves 8, extending in a transverse direction across the frame and forming ways in which the parallel parts 9 of the U-shaped wire member 10 travel, when the device is in use. At one extremity of each groove, the frame is provided with transversely-projecting lugs 12 which are perforated to receive the parts 9 of the U-shaped member, the said lugs forming guides for the said member. A wire 13 has its opposite extremities connected with the free ends of the U-shaped member by means of screws 14, the wire part 9, whose body portion is cylindrical in shape, being partially cut away, as shown at 15, to form flat seats for the screws and also to practically countersink the latter.

To the opposite side members 6 of the rectangular frame are secured tension gage plates 17, by means of screws 18, which, on one side of the rectangular frame are passed through depending parts 19 of the guide lugs 12, the tension gage plates being located between the said lugs on one side of the frame, both sides of the frame, however, being provided, below the said lugs, with extensions 20, which engage the extremities of the said plates. On the opposite side of the rectangular frame from the guide lugs 12, the said frame is provided with ears 21, through which two of the fastening screws in one of the gage plates pass, the perforations in the said ears, as well as in the depending parts 19 of the lugs 12, being threaded for the purpose, the shanks of the screws simply engaging curved projections 22 formed at the opposite extremities and on the upper edges of the two plates, the screws 18 being so located as to allow the gage plates the necessary lateral movement for adjusting the tension of the transverse cutting wire members 23, as hereinafter more fully explained. These gage plates are laterally adjustable by means of screws 24, which are threaded into openings formed therein, the inner extremities of the screws bearing against the outer surfaces of the side parts 6 of the rectangular frame. By virtue of this construction and arrangement, it will be understood that, as the screws are turned to move them inwardly toward the adjacent side plates of the frame, against which they abut, the gage plates will be moved outwardly away from the frame, thus giving the necessary tension to the transverse wire members 23. Each of the gage plates is provided on its lower edge, or the edge which is lowermost when the device is in position for use for butter cutting purposes, with outwardly-projecting lips 25, which are suitably spaced to determine the distance between the wire members or sections 23. These wire members or sections preferably consist of a single wire, whose extremities are anchored in slotted lugs 26, which, when the gage plates are in position, are located at opposite diagonal corners of the rectangular frame, this feature being, perhaps, best illustrated in Fig. 4. In applying the wire, one extremity of it is first anchored by forming a knot thereon and passing the wire end through an open slot in the lug, the said knot being above the lug when the device is in the position for butter cutting purposes. The wire is then carried transversely across the frame, engaging the opposite side edges thereof, passed underneath the adjacent lip 25 of the opposite side from the anchored end, after which the wire is carried in the opposite direction and parallel with the first part 23, looped underneath another lip, and so on, until all of the parts 23 have been arranged upon the rectangular frame, the free end of the wire being then knotted and anchored in the opposite diagonal lug 26. During this operation of applying the wire strand, which forms the wire members or cutting sections 23, the gage plates must be so arranged by the adjustment of their screws 24, that these plates may still be moved outwardly for the purpose of regulating the tension of the cutting sections 23. An additional wire 27 is then applied to the device at right angles to the parts 23, it being preferably passed alternately above and below the adjacent coöperating wire parts 23, one extremity of the wire 27 being anchored by means of a screw 28 applied to one end of the rectangular frame, its opposite extremity being connected with a small crank 29, with which an eye 30 is provided, the said eye surrounding a fastening screw 31 threaded in the end member of the frame and engaging a washer 32, which is in direct contact with the said member. By turning this eye 30 to the proper position, the wire 27 may be given the necessary tension, after which the screw 31 is tightened to maintain the tension eye in the adjusted position. The upper end edges of the rectangular frame are each provided with a number of small notches or recesses 33 adapted to be engaged by the opposite ends of the wire member 27. The object of these notches is to enable the user of the device to regulate the position of the cutting wire member 27, so that it shall always be centrally located with reference to the cake of butter to be cut. These butter cakes sometimes vary in dimensions; in other words, one cake may be somewhat wider than another, though both will enter the rectangular frame. Of course, if the cakes were always of such a width as to exactly fill the frame between its side members, there would be no necessity for the adjustment of this wire 27. However, it will be understood that, if the cake of butter is slightly less in width than the space between the two side members of the frame, in order to keep one side of the butter cake in close contact with the inner surface of one of the side members of the frame, in order to guide the latter for accurate cutting, it will be necessary to adjust the wire member 27 by loosening the screw 31 and causing the said member to engage other notches or recesses in the end parts of the frame, whereby the said wire is centrally located with reference to the cake of butter to be cut. When this is done, assuming that the U-shaped member, carrying the cutting wire 13 is in place, the device is ready for use.

From the foregoing description, the manner of manipulating my improved butter cutter for the purpose of performing the butter cutting function will be readily understood. A cake or brick of butter of the proper size, say containing a pound, is laid upon a flat surface, after which the butter cutter is lifted by the user above the butter cake by grasping the opposite end flanges 7 of the rectangular frame, the U-shaped member carrying the wire 13 being drawn outwardly to its limit of movement, as illustrated in Fig. 1. The device is then placed on top of the cake of butter with the cutting wire members 23 and the longitudinal member 27 in contact with the upper surface of the said cake, the rectangular frame being so arranged that the cake of butter has its vertical walls within the limits of the rectangular frame. The device is then pressed down upon the cake of butter until the wire parts 23 and 27 have passed through the same and are brought into engagement with the surface upon which the cake of butter rests. In this event, half of the cake of butter protrudes above the top of the rectangular frame. The U-shaped member is then moved forwardly, or in a direction to cause its wire 13 to pass through the cake of butter in a plane parallel to the top and bottom surfaces of the said cake. The latter is then cut into the desired number of pieces. The device may then be lifted, carrying the cake of butter cut, as aforesaid, and, by inverting it, the cake of butter in sub-divided form may be removed from the device, after which the operation may be repeated. By virtue of this construction, it will be understood that the butter, in sub-divided form, may be removed from the cutter without the necessity of touching it with the hands, thus making the device sanitary in the maximum degree.
Having thus described my invention, what I claim is:

1. A butter cutter comprising a rectangular frame open at the top and bottom, its opposite ends being equipped with flanges whose upper surfaces are flush with the upper edge of the frame, the said flanges being provided with grooves, the frame being equipped with perforated lugs arranged at the extremities of the respective grooves, and a U-shaped member whose parallel parts are arranged to travel in the perforations of said lugs and in the grooves of the said flanges, and a wire applied to the free extremities of the parallel parts of said member and coöperating with the other wires for butter cutting purposes, substantially as described.

2. A butter cutter comprising a rectangular frame open at the top and bottom and having manipulating end flanges projecting from the upper part of the frame, butter cutting members extending across the lower opening of the frame, means for regulating the tension of the said members, and a U-shaped member slidably mounted on the upper part of the frame and carrying a coöperating butter cutting wire adapted to move across the top opening of the frame, the depth of the latter being less than the cake of butter to be cut, for the purpose set forth.

3. A butter cutter comprising a frame open at the top and bottom and having oppositely located end members for manipulating purposes, said members having grooves, gage plates detachably applied to the opposite sides of the frame, cutting wire members applied to the said gage plates, a U-shaped member arranged to travel in said grooves and a coöperating wire member mounted thereon to pass across the upper opening of the frame, for the purpose set forth.

4. A butter cutter comprising a frame open at the bottom and having wires extending across said opening for butter cutting purposes, screws projecting through the ends of the said frame, means adjustably applied to the frame and provided with members projecting upwardly and overlapping said screws and with which means the said wires are connected for the purpose of regulating their tension.

5. A butter cutter comprising a frame open at the top and bottom and having a depth equal substantially to one-half the thickness of the cake of butter to be cut, perforated lugs mounted on the frame, cutting wire members stretched across the lower opening of the frame, a U-shaped member adapted to pass through the said lugs, and a coöperating wire member mounted thereon to travel across the upper opening of the frame.

In testimony whereof I affix my signature in presence of two witnesses.

HARRY B. WATERS.

Witnesses:
F. E. BOWEN,
C. E. BRODEN.

Copies of this patent may be obtained for five cents each, by addressing the "Commissioner of Patents, Washington, D. C."